United States Patent
Kobayashi et al.

Patent Number: 5,485,245
Date of Patent: Jan. 16, 1996

[54] IMAGE FORMING APPARATUS IN WHICH IMAGES ARE STORED IN AN EXTERNAL MEMORY

[75] Inventors: Kenji Kobayashi; Akimaro Yoshida, both of Tokyo, Japan

[73] Assignee: Canon Kabushiki Kaisha, Tokyo, Japan

[21] Appl. No.: 139,885

[22] Filed: Oct. 22, 1993

Related U.S. Application Data

[63] Continuation of Ser. No. 873,633, Apr. 23, 1992, abandoned, which is a continuation of Ser. No. 606,474, Oct. 30, 1990, abandoned, which is a continuation of Ser. No. 290,637, Dec. 27, 1988, Pat. No. 4,992,827.

[30] Foreign Application Priority Data

Dec. 28, 1987 [JP] Japan ................ 62-329681
Dec. 28, 1987 [JP] Japan ................ 62-329682
Dec. 28, 1987 [JP] Japan ................ 62-329683
Dec. 28, 1987 [JP] Japan ................ 62-329684

[51] Int. Cl.$^6$ ........................ G03G 21/00
[52] U.S. Cl. ............. 355/202; 355/210; 358/296
[58] Field of Search ................ 355/244, 210, 355/319, 202, 204, 218, 229, 232, 200; 346/45; 358/296, 300; 400/72; 347/3, 112

[56] References Cited

U.S. PATENT DOCUMENTS

| | | | |
|---|---|---|---|
| 3,964,591 | 6/1976 | Hill et al. | 400/72 X |
| 4,388,010 | 7/1988 | Watanabe et al. | 358/296 X |
| 4,417,282 | 11/1983 | Yamamoto | 358/296 |
| 4,591,997 | 5/1986 | Grabel | 364/518 X |
| 4,639,791 | 1/1987 | Masaki | 358/300 |
| 4,655,577 | 4/1987 | Ikuta | 355/202 |
| 4,660,999 | 4/1987 | Tsuneki | 400/121 X |
| 4,696,562 | 9/1987 | Urata et al. | 355/202 |
| 4,745,491 | 4/1988 | Kishi et al. | 355/202 X |
| 4,819,083 | 4/1989 | Kawai et al. | 358/296 X |
| 4,821,107 | 4/1989 | Naito et al. | 358/300 X |
| 4,992,827 | 2/1991 | Kobayashi et al. | 355/202 |

*Primary Examiner*—Sandra L. Brase
*Attorney, Agent, or Firm*—Fitpatrick, Cella, Harper & Scinto

[57] ABSTRACT

An image forming apparatus is capable of reproducing a read image in combination with a format, without reading a format sheet every time. The format information is read from an external detachable memory, and is combined in the apparatus with the data read by an image reader.

30 Claims, 12 Drawing Sheets

IMAGE FORMING APPARATUS IN WHICH IMAGES ARE STORED IN AN EXTERNAL MEMORY

This application is a continuation of application Ser. No. 07/873,633 filed Apr. 23, 1992, now abandoned, which in turn is a continuation application of Ser. No. 07/606,474 filed Oct. 30, 1990, now abandoned, which in turn is a continuation application of Ser. No. 07/290,637 filed Dec. 27, 1988, now U.S. Pat. No. 4,992,827, issued Feb. 12, 1991.

BACKGROUND OF THE INVENTION

1. Field of the Invention

The present invention relates to an apparatus for forming an image on a recording material, and more particularly to an image forming apparatus capable of reading image data from an external recording medium and forming a corresponding image on the recording material.

2. Related Background Art

In the related field, there are already commercialized analog image forming apparatus for optically scanning an original, equipped with an inverting mechanism for the recording sheet and capable of forming images on both sides of the recording sheet or forming multiple images on a side thereof by inverting or not inverting the sheet according to the instruction of an operation unit.

Such apparatus has enabled one to obtain a preformatted image or images on one side or both sides of the recording sheet by scanning a format image sheet, containing particular logos or charts consisting of horizontal and vertical lines. It is thus made possible to obtain a form overlay image of a predetermined format and an original image, by transferring the image of the original onto the predetermined format, by utilizing the above-mentioned sheet inverting mechanism.

However, in case of forming the format on the recording sheet by means of the format image sheet as explained above, it is necessary to prepare a format sheet and a corresponding original, and to conduct the exposure operation twice before the final image is obtained, so that the operation is quite complex.

Also the format sheet has to be exposed every time, so that the sheet is often smeared or creased according to the frequency of use thereof and has to be carefully stored and handled.

SUMMARY OF THE INVENTION

In consideration of the foregoing, an object of the present invention is to provide an improved image forming apparatus.

Another object of the present invention is to provide an image forming apparatus with improved operability.

Still another object of the present invention is to provide an image forming apparatus capable of reproducing a desired image at any time, without scanning an original image.

Still another object of the present invention is to provide an image forming apparatus capable of image formation utilizing an external memory medium storing format information.

Still another object of the present invention is to provide an image forming apparatus capable of forming an image corresponding to information stored in an external memory medium and an image formed by scanning an original, on the same side or both side of a recording material.

The foregoing and still other objects of the present invention will become fully apparent from the following description to be taken in conjunction with the attached drawings.

DETAILED DESCRIPTION OF THE PREFERRED EMBODIMENTS

Figure 1:
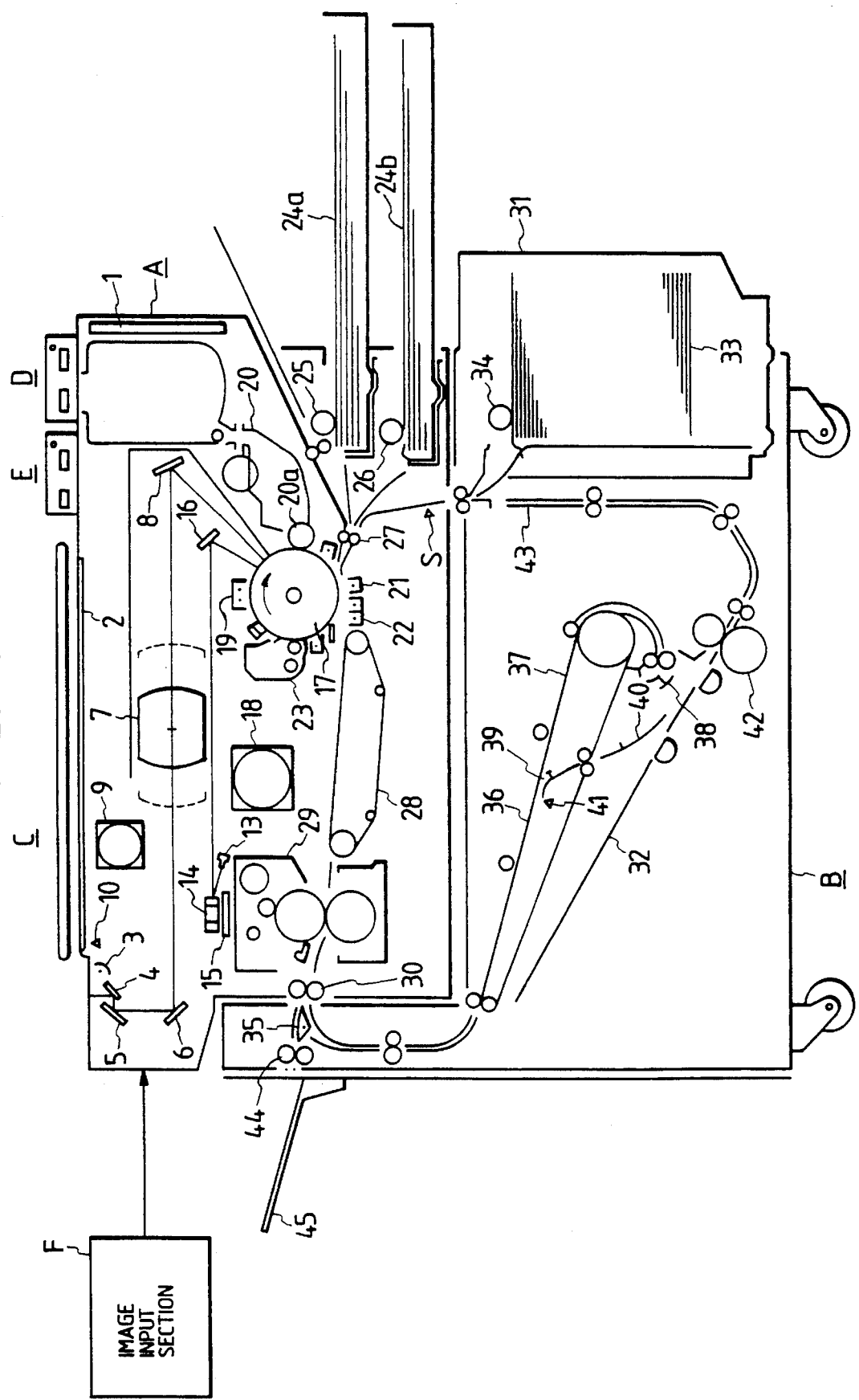
FIG. 1 is a cross sectional view of an image forming apparatus embodying the present invention.

FIG. 1 is a cross-sectional view of an image forming apparatus embodying the present invention, composed principally of a main body A of the copying machine, a pedestal unit B, an editor unit C, an IC card unit D, an administration unit E and an image input unit F. The units B–F are arbitrarily connectable to the main body A.

In the main body A, a system controller (sequence controller 1 is composed of a CPU serving as a controller for controlling said units A–F, a ROM, a RAM, an interface etc. and serves also as imaging control means for the present invention.

An original support glass 2 supports the original document in a flat state. An illuminating lamp (exposure lamp) 3 is used for illuminating the original document placed on the original support glass. Scanning mirrors 4–6 are used for deflecting the path of the light reflected from the original illuminated by the exposure lamp 3. The illuminating lamp 3 and the mirror 4 constitute an integral unit movable in the scanning or reading operation of the original.

A lens 7 regulates the path length and the focus state of the reflected light deflected by the scanning mirror 6. The lens 7 is placed at a suitable position, between the broken-lined positions, corresponding to the image magnification instructed by the operation unit to be explained later.

A scanning mirror 8 deflects the light reflected from the original and projected through the lens 7, toward a photosensitive member 17. An optical system motor 9 moves the scanning unit with a constant speed corresponding to the image magnification. An image front sensor 10 detects the moving state of the scanning unit and transmits it to the sequence controller 1 serving as the imaging control means of the present invention. A semiconductor laser 13 is on/off modulated according to the format image data, to be read by the sequence controller 1 from an IC card constituting the external memory means of the present invention and inserted in the IC card unit d, and the light from the laser is deflected by a polygon mirror 14 rotated at a constant speed by a scanner motor 15 and then by a mirror 16 to form a format image on the photosensitive member 17. The above-mentioned components 13–16 constitute a laser unit, serving as imaging writing means of the present invention. A main motor 18 is used for rotating the photosensitive member 17 in a direction indicated by an arrow, in a constant speed. A high voltage unit 19 charges the photosensitive member 17 at a potential for forming a latent image. A developing unit 20 develops the original image and the format image formed on the photosensitive member 17 with developing material (toner) supplied from a toner hopper.

A transfer charger 21 transfers or record the developed image, formed on the photosensitive member 17, onto a transported recording sheet. A separating charger 22 separates the recording sheet, after the image transfer, from the photosensitive member 17. A cleaner device 23 recovers the toner remaining on the photosensitive member 17.

An upper cassette 24a is provided for supplying the main body A with the recording sheet by means of a sheet feed roller 25. A lower cassette 24b is provided for supplying the main body A with the recording sheet by means of a sheet feed roller 26. Registration rollers 27 aligns the front end of the image formed on the photosensitive member 17 with the front end of the supplied recording sheet, by advancing the stopped recording sheet to the main body A at a predetermined timing. A conveyor belt 28 transports the recording sheet, after the image transfer, to a fixing unit 29, which fixes the image on the recording sheet transported thereto, by means of heat and pressure.

In the following there will be explained the function of the main body A.

The photosensitive member 17 is provided on its surface with a seamless photosensitive member composed of a photoconductive layer and a conductive layer, and is rotatably supported. It starts rotation at a constant speed in a direction indicated by arrow, by an means of the main motor 18 activated in response to the actuation of a copy start key to be explained later. Then, after predetermined rotation control and potential control for the photosensitive member 17, the original document placed on the original support glass 2 is illuminated by the scanning unit composed of the scanning mirror 4 and the illuminating lamp 3 integral therewith, and the reflected light is focused, through the scanning mirrors 4–6, lens 7 and mirror 8, onto the photosensitive member 17. The photosensitive member 17 is in advance corona charged by the high voltage unit 19, and is then subjected to the slit exposure of the light reflected from the original illuminated by the lamp 3, thereby forming an electrostatic latent image according to a known electrophotographic process.

The electrostatic latent image formed on the photosensitive drum 17 is developed, by a developing roller 20a in the developing unit 20, into a visible toner image, which is then transferred onto the recording sheet by the transfer charger as will be explained later. The recording sheet stored in the upper cassette 24a or the lower cassette 24b is fed into the main body by the feed roller 25 or 26, and is advanced toward the photosensitive member 17 with an exact timing with the registration rollers 27 whereby the front end of the latent image is aligned with that or the recording sheet. Thereafter, the toner image on the photosensitive member 17 is transferred onto the recording sheet when it passes between the transfer charger 21 and the photosensitive member 17. After said image transfer step, the recording sheet is separated from the photosensitive member 17 by the separating charger 22, then transported to the fixing unit 29 by the conveyor belt 28, and discharged from the main body A by discharge rollers 44.

After the image transfer, the photosensitive member 17 continues rotation to enter a post-rotation step, and its surface is cleaned by the cleaner unit 23 consisting of a cleaning roller and an elastic blade, whereby the remaining toner is recovered.

In the pedestal unit B, a paper deck 31 can store, for example, 2000 recording sheets. An intermediate tray 32 stores the recording sheets after image formation, with the image bearing face thereof upwards in case of two-side copying, or with the image bearing face thereof downwards in case of multiple copying. A lifter 33 gradually lifts the stacked sheets, according to the quantity thereof, in such a manner that the uppermost recording sheet is in contact with a sheet feed roller 34.

A discharge flapper 35 diverts the recording sheet, transported by the transport rollers 30, either to a path for two-side recording or multiple recording, or to a discharge path. In case the path for two-side or multiple recording is selected, the sheet passes transport paths 36, 37. An intermediate tray weight 38 serves to invert the recording sheet which has passed the discharge flapper 35 and transport paths 36, 37, before storage into the intermediate tray 32.

A multiple copying flapper 39 for selecting the sheet path for two-side copying or that for multiple copying, is positioned between the transport path 36 and 37, and guides the sheet to a transport path 40 for multiple copying when rotated upwards. A multiple copying discharge sensor 41 detects the rear end of the recording sheet passing through the multiple copying flapper 39 and informs the system controller 1 of the detection. A sheet feed roller 42 feeds the recording sheet toward the photosensitive member 17 through a path 43. Discharge rollers 44 discharge the recording sheet, after image formation, from the pedestal B. A discharged sheet tray 45 receives the recording sheets after image formation.

In the following there will be explained the function of the pedestal unit B.

In the two-side copying or multiple copying, the discharge flapper 35 of the pedestal unit B is lifted, whereby the recording sheet, after formation, is stored in the intermediate tray 32 through the transport paths 36, 37. The multiple copying flapper 39 is lowered or lifted respectively in the two-side copying or in the multiple copying. The intermediate tray 32 can store, for example, 99 recording sheets at maximum. The sheets stacked on the intermediate tray 32 are pressed down by the intermediate tray weight 38.

In the succeeding recording operations on the rear side of the sheets, or in the multiple copying operations, the recording sheets stacked on the intermediate tray 32 are fed, one by one, from the bottom, and guided to the registration rollers 27 in the main body A by means of the sheet feed rollers 42 and the intermediate tray weight 38.

In the following there will be given an explanation on the editor unit C, with reference to FIG. 2.

Figure 2:
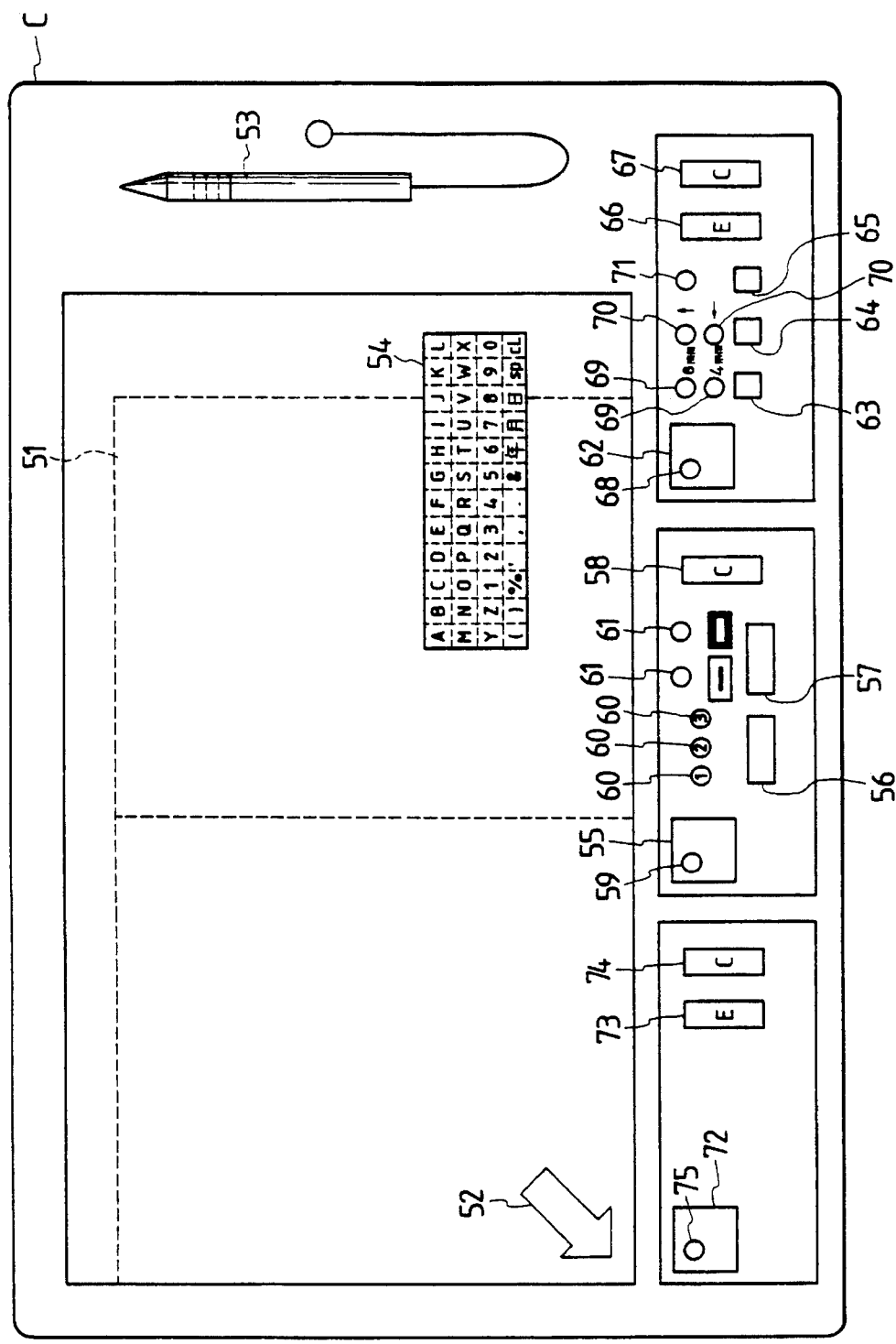
FIG. 2 is a plan view of an editor unit shown in FIG. 1.

FIG. 2 is a plan view of the editor unit C shown in FIG. 1. There are shown a digitizer 51 for setting an original and entering the coordinates in area designation, character add-on or input of handwritten patterns; a reference mark 52 designating the end position of the original; a stylus pen 53 for pressing the digitizer 51 thereby entering the coordinates in case of area designation, character add-on or input of handwritten patterns; an input information area 54 for entering characters of alphabets, numerals, symbols, date information etc. shown in the area into the system controller 1 by means of the stylus pen 53; an area mode key 55 for instructing an area designation mode to the system controller 1; a memory key for storing an area designated by the stylus pen 53, for example a rectangular area defined by two diagonal points; a mode key 57 for trimming or masking an area designated by the stylus pen 53; a clear key 58 for clearing the area information stored in an internal memory of the system controller 1, thereby cancelling the area designation; an area designation mode indicator 59 to be lighted when the key 55 is depressed; area storage number indicators 60 to be lighted in succession at each depression of the stylus pen 53 or the memory key 56, all being lighted for example if three area information are stored; and a mode indicator 61 for cyclically indicating the masking mode or trimming mode at each depression of the mode key 57.

There are also shown an add-on mode key 62 to be depressed in case of adding characters to an image, thereby informing the system controller 1 of the add-on mode; a font size key 63 for selecting the size of characters to be added, for example 4 mm or 8 mm; a direction designation key 64 for instructing, to the system controller 1, the direction of characters to be written, either parallel or perpendicular to the advancing direction of the recording sheet; a character position designation key 65 for instructing the writing start position of characters to the system controller 1; an enter key 66 for instructing the end of character writing to the system controller 1; a character clear key 67 for instructing the clearing of entered character information to the system controller 1; a character input indicator 68 to be lighted when the add-on mode key 62 is depressed, thereby informing the operator of the character input mode; and font size indicators 69 to be alternately lighted in response to the depressions of the font size key 63 thereby indicating the selected font size.

There are further provided writing direction indicators 70 to hie alternately lighted in response to the depressions of the direction designation key 64, thereby indicating the designated writing direction; a position input end indicator 71 to be lighted in response to the depression of the enter key 66, thereby indicating the end of position input; and a handwriting input mode key 72 for instructing a handwriting input mode to the system controller 1 and also turning on an indicator 75 for informing the operator of the mode.

An enter key 73 instructs the end of the handwriting input mode to the system controller 1. A handwriting mode clear key 74 clears the mode.

Figure 3A:
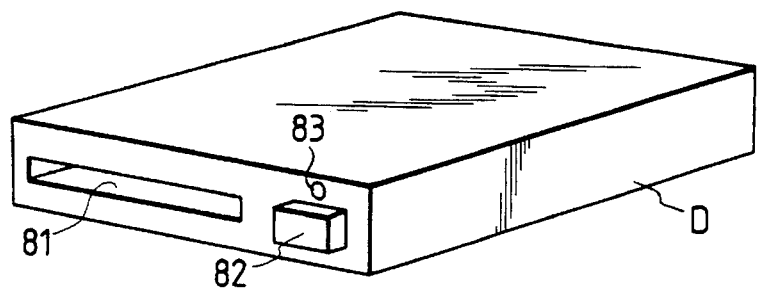
FIGS. 3A and 3B are respectively a perspective view and a cross-sectional view of an IC card unit shown in FIG. 1.
Figure 3B:
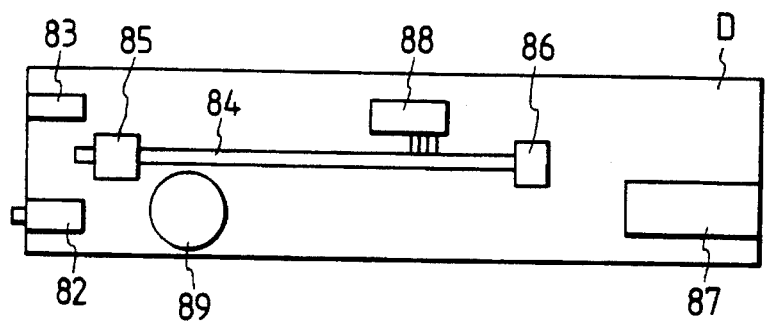

In the following discussion, there will be explained the structure of the IC card unit D shown in FIG. 1, with reference to FIGS. 3A and 3B, which are respectively a perspective view and a cross-sectional view of the unit D.

An IC card 84 is inserted into a card slot 81. The IC card 81 is composed of semiconductor integrated circuits, such as CPU, RAM and ROM, on a substrate such as a plastic card. The IC card, constituting external memory means, and stores format sheet image (data of lines consisting of "1" and "0") in one or plural forms (format sheet images of different sizes). Also the IC card 84 stores division codes for prohibiting the copying of the format sheet images, and if one of the division codes coincides with the division code of a magnetic card to be explained later, the copying of the format sheet image is prohibited by the sequence controller 1 according to a flow chart to be explained later.

There are also shown a card eject button 82 to be depressed for ejecting the inserted IC card 84; an indicator 83 to be lighted or extinguished respectively when the IC card 84 is inserted or ejected; card position sensors 85, 86 for respectively detecting the insertion of the IC card 84 and the completion of insertion thereof and informing the sequence controller 1 of the detection; a connector 87 for connection with the main body A; contacts 88 for contacting the ports of the IC card 84; and a transport motor 89 to be activated forward when the insertion of the IC card 84 is detected by the card position sensor 85 thereby loading the IC card and stopped when the IC card 84 is detected by the card position sensor 86, and to be reversed in response to the actuation of the card eject button 82 to extract the card, and stopped when the card position sensor 85 becomes unable to detect the IC card 84.

Figure 4A:
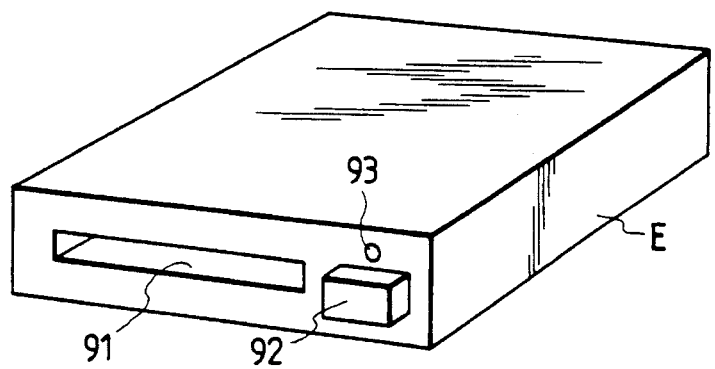
FIGS. 4A and 4B are respectively a perspective view and a cross-sectional view of an administration unit shown in FIG. 1.
Figure 4B:
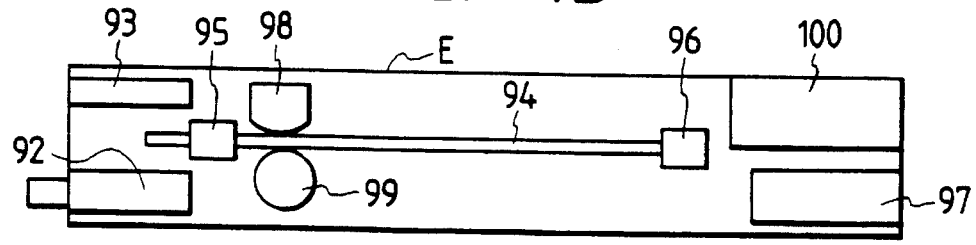
Figure 4C:
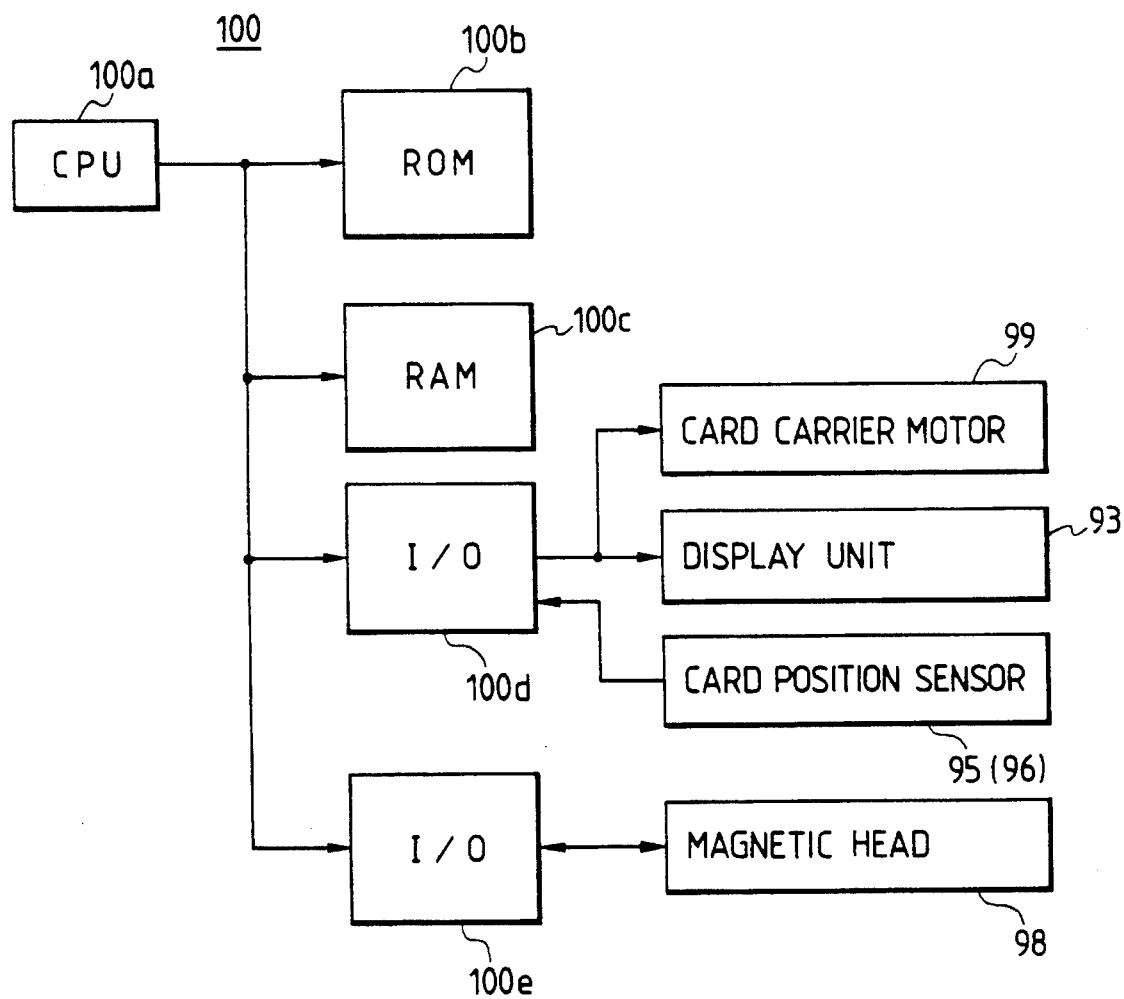
FIG. 4C is a block diagram thereof.

In the following discussion, there will be given an explanation on the structure of the administration unit E shown in FIG. 1, with reference to FIGS. 4A to 4C, which are respectively a perspective view, a cross-sectional view and a block diagram thereof.

There are shown a card slot 91 for accepting a magnetic card 94; a card eject button 92 to be depressed for ejecting the inserted magnetic card; an indicator 93 to be lighted or extinguished respectively when the magnetic card 94 is inserted or extracted; card position sensors 95, 96 for respectively detecting the insertion of the magnetic card 94 and the completion of the insertion and informing the sequence controller 1 of the detection; a connector 97 for connection with the main body A; a magnetic head 98 for reading the data (division code) recorded on the magnetic card 94 or writing the division data released from the sequence controller 1; a card transport motor 99 to be activated forward to load the magnetic card when the insertion thereof is detected by the card position sensor 95, and stopped when the card is detected by the sensor 96, or to be reversed to extract the magnetic card 94 in response to the actuation of the card eject button 92, and stopped when the sensor 95 becomes unable to detect the magnetic card 94; and a control unit 100 composed of a CPU 100a, a ROM 100b, a RAM 100c, interface units 100d, 100e etc. the CPU 100a controls various units according to a control sequence (control program) stored in advance in the ROM 100b. The RAM 100c functions as a work memory for the CPU 100a and temporarily stores the input data. The interface 100d transmits the control signals from the CPU 100a to the card transport motor 99, indicator 93 and other loads, and also transmits the detection signals from the card position sensors 95, 96 to the CPU 100a. The interface (I/O) 100e supplies the magnetic head 98 with write signals, and transmits the data read by the magnetic head 98 to the CPU 100a.

The CPU 100a discriminates the data read, through the interface 100e, from the magnetic card 94 inserted in the slot 91 of the administration unit E, and, if the data are a division code, the CPU 100a sends a copy enable signal to the sequence controller 1 of the main body A and controls the number of copies. Also, if an upper limit copy number is determined, it discriminates whether the number has been exceeded, and, when the upper limit number is exceeded, it sends a copy disable signal to the sequence controller 1 of the main body A. If the data read from the magnetic card 94 are not the division code but code information indicating a function, the CPU 100a executes a process necessary for the function as will be explained later in detail. If the data read from the magnetic card 94 are a predetermined division code, there is discriminated whether it corresponds to one of the division codes for which the copying of the format sheet image stored in the IC card 84 is forbidden, and the copying is prohibited according to a flow chart to be explained later.

In the following there will be given an explanation on the operation unit of the main body A shown in FIG. 1, while making reference to FIG. 5.

Figure 5:
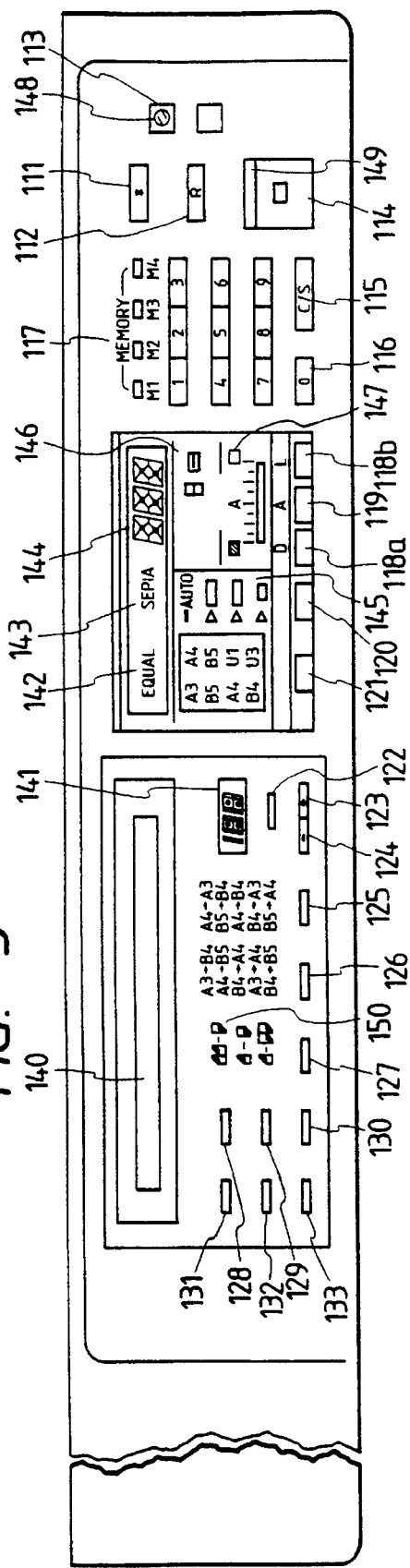
FIG. 5 is a plan view-of an operation unit of the main body shown in FIG. 1.

FIG. 5 is a plan view of the operation unit of the main body 1 shown in FIG. 1, wherein shown are an asterisk "*" key 111 to be depressed for a mode of setting the binding margin or a mode of setting the size of erasing the frames in the original, or for selecting a desired format information from the IC card; and an all reset key 112 for restoring a standard mode (same size, automatic density control, automatic sheet feeding, and copy number "1") from any mode; a pre-heating key 113 for starting pre-heating or cancelling pre-heating of the print engine in the main body A. It is also used for restoring the standard mode from an automatic shut-off state.

A copy start key 114 is used for starting a copying operation. A clear/stop key 115 functions as a clear key during the stand-by state, or as a copy stop key during the copying operation. Key 115 can also be used for clearing the entered copy number or cancelling the asterisk mode. It is also used for interrupting a continuous copying operation, which is interrupted after the completion of a copying cycle in progress at the actuation of the key.

There are also provided numeral keys 116 for setting the number of copies or for setting the asterisk mode; a memory key 117 for registering a mode frequently used by the operator; copy density keys 118a, 118b for manually regulating the copy density; and an automatic density regulating (automatic exposure) key 119 for selecting a mode of automatically regulating the copy density according to the original density or a mode of manual density control instead of the automatic density control mode.

A cassette selecting key 120 is used for sheet supply from the upper cassette 24a, lower cassette 24b or a paper deck 31. Also if the cassette selecting key 120 is depressed when an original is placed on the editor unit C, there is set an automatic paper cassette selection (APS) mode in which automatically selected is a cassette containing sheets of a size matching that of the original.

There are further provided a same size key 121 for obtaining a copy same in size as the original; an automatic size variation key 122 for automatically enlarging or reducing the image of the original according to the size of the selected recording sheet; zoom keys 123, 124 for arbitrarily selecting the image magnification within a range from 64 to 142% with respect to the size of the original, or for selecting a desired format image stored in the IC card; fixed magnification keys 125, 126 for selecting predetermined image sizes; a two-side key 127 to be used in case of making a two-side copy from a one-side original, a two-side copy from a two-side original or a one-side copy from a two-side original; a binding margin key 128 for forming a binding margin of a predetermined size at the left side of the recording sheet; and a multiple key 130 for forming images of two originals on a same side of the recording sheet.

An original frame erasing key 131 is to be depressed in case of erasing the frame of the original of predetermined sizes, and, in such case, the original size is selected by the asterisk key 111. A sheet frame erasing key 132 is used for erasing the frame of the original according to the size of the cassette size. A page continuous copy key 133 is used for copying the left and right pages of the original respectively on different sheets.

A liquid crystal message display 140 is capable of displaying a message of 40 characters at maximum, each character being composed of 5×7 dots. Display 140 is composed of a semi-transparent liquid crystal display with two-colored rear illumination, which is green in the normal state but becomes orange in case of an abnormality or in a copy disabled state. An image magnification indicator 141 shows the copy magnification, selected by the zoom keys 123, 124, in percentage. A same size indicator 142 is lighted when same size copying is selected. A color development indicator 143 is lighted when a sepia developing unit is loaded. A copy number indicator 144 indicates the number of copies or self diagnosis codes. A cassette indicator 145 indicates whether the upper cassette 24a, lower cassette 24b or paper deck 31 is selected.

There are further provided an original direction indicator 146 for setting direction (longitudinal or transversal) of the original; an AE indicator 147 to be lighted when the automatic density control (AE) is selected by the AE key 119; a preheating indicator 148 to be lighted during the preheating state but to be turned off in the automatic shut-off state; a ready/wait indicator 149 consisting of a green/orange two-color LED which is lighted green in the ready (copy enabled) state but orange in the waiting (copy disabled) state; and a two-side indicator 150 when two-side copying from a two-side original or two-side copying from a one-side original is selected.

In the standard mode, there are selected conditions of one copy, automatic density control mode, automatic sheet selection, same size copying, and one-side copying from a one-side original.

In the following there will be given an explanation on the structure of the system controller 1 shown in FIG. 1, with reference to FIG. 6.

Figure 6:
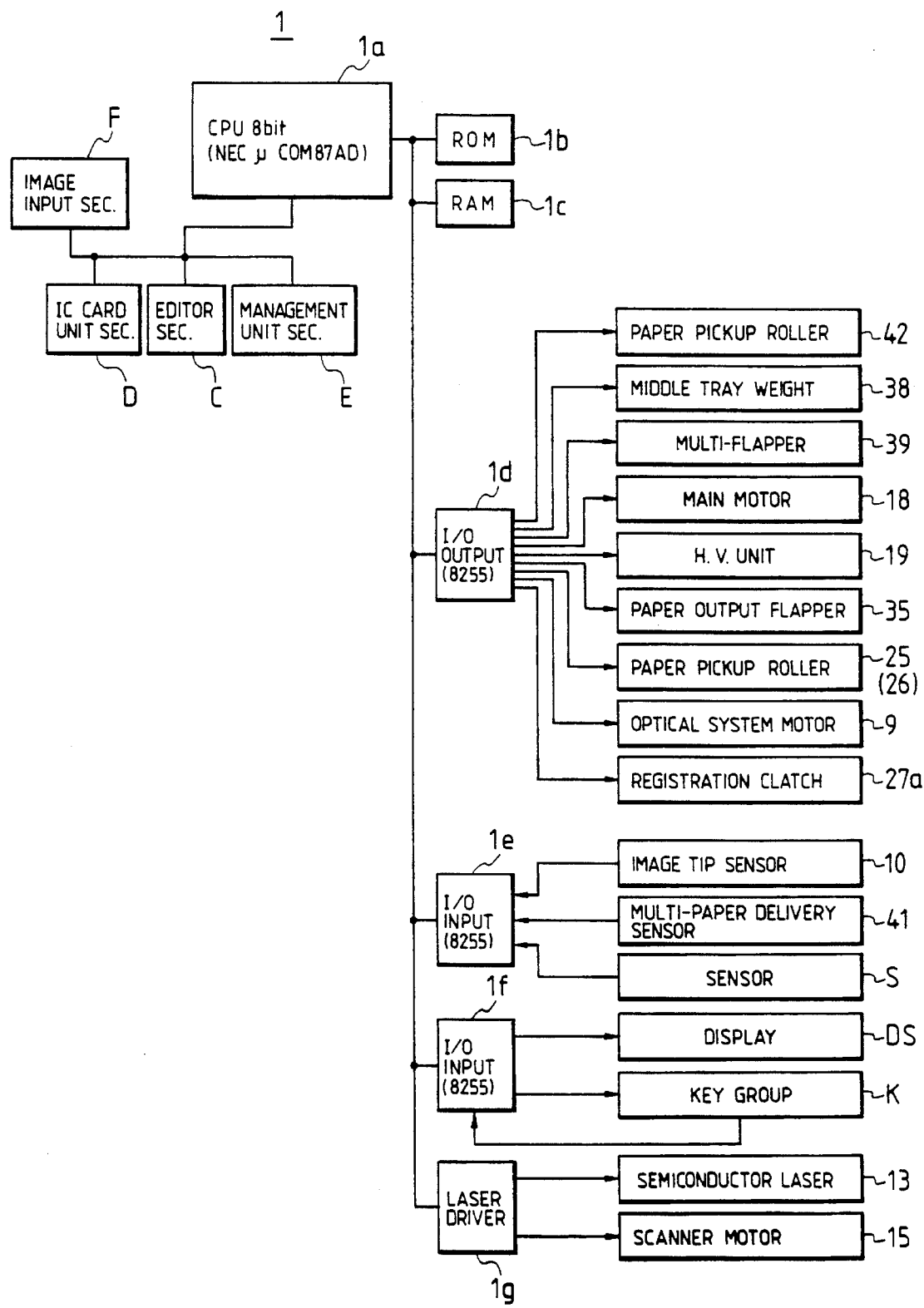
FIG. 6 is a block diagram of a system controller shown in FIG. 1.

FIG. 6 is a block diagram of the system controller shown in FIG. 1, wherein the same components as those shown in FIGS. 1 to 5 are represented by the same numbers.

In FIG. 6 there are shown a CPU 1a composed, for example, of μCOM87AD manufactured by Nippon Electric Co. Ltd. and controls various units according to control programs stored in a ROM 1b; a RAM 1c constituting a main memory and functioning as a memory for the input data and as a work memory area; an output interface 1d composed for example of an input/output port μPD8255 manufactured by Nippon Electric Co., Ltd. and sending control signals from the CPU 1a to loads such as the main motor 18; an input interface 1e composed for example of an input/output port μPD8255 manufactured by Nippon Electric Co., Ltd. and sending detection signals from the sensors to the CPU 1a; and an interface circuit if composed for example of an input/output port μPD8255 manufactured by Nippon Electric Co., Ltd. for input/output control of the displays DS, keys K of the operation unit shown in FIG. 5.

The displays DS collectively includes the indicators composed of LED's and LCD's shown in FIG. 5. The keys K correspond to those shown in FIG. 5, and the depressed key is identified by the CPU 1a by a known key matrix.

A laser driver 1g releases drive signals for the semiconductor laser 13 and the scanner motor 15 in response to drive control signals from the CPU 1a. A registration clutch 27a for driving the registration motor 27 shown in FIG. 1. A pedestal sensor S corresponds to the sensoring the pedestal unit B.

In the following there is explained an image writing/erasing operation by image writing means of the present invention, while making reference to FIG. 7.

Figure 7:
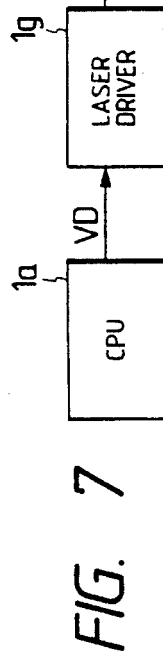
FIG. 7 is a perspective view showing the function of a semiconductor laser shown in FIG. 1.

FIG. 7 is a perspective view showing the function of the semiconductor laser 13 shown in FIG. 1, wherein the same components as those in FIGS. 1 and 6 are represented by the same numbers.

A collimating lens 151 converts the laser beam from the semiconductor laser 13 into a parallel beam. A cylindrical lens 152 adjusts the optical axis of the laser beam from the collimating lens in such a manner that it becomes parallel, on a scanning mirror 16, to the axis of the photosensitive member 17. An imaging lens 153 regulates the laser beam deflected by the polygon mirror 14 at a constant speed on the photosensitive member 17.

The format sheet image data stored in the IC card 84 inserted into the IC card unit D are fetched by the CPU 1a into the RAM 1c, and a video signal VD corresponding to the data is supplied to the laser driver 1g. In response the laser driver 1g releases a laser drive signal LD for driving the semi-conductor laser 13, which emits the laser beam on/off modulated by the signal LD. The emitted laser beam is converted into a parallel beam by the collimating lens 151, and further converted into a linear trajectory parallel, on the scanning mirror 16, to the axis of the drum. The laser beam is then deflected by the polygon mirror 14 rotated at a constant speed, transmitted through the imaging lens 153 and forms an electrostatic latent image on the photosensitive member 17.

As the electrostatic latent image can be made in an arbitrary position on the photosensitive member 17 with a high precision, for example of 4 pel (4 dots/mm) in the present embodiment under the control with the video signal VD released from the CPU 1a, the format sheet image stored in the RAM 1c can be reproduced on the recording sheet when required.

In the following discussion, there will be explained the operation of reading the format sheet image from the IC card 84.

The IC card 84 stores image data constituting format sheet images consisting of table lines, logos etc., and, when the IC card 84 is inserted into the slot 81 of the IC card unit D, said the image data are read line by line and developed on the RAM 1c of the sequence controller 1.

Figure 8:
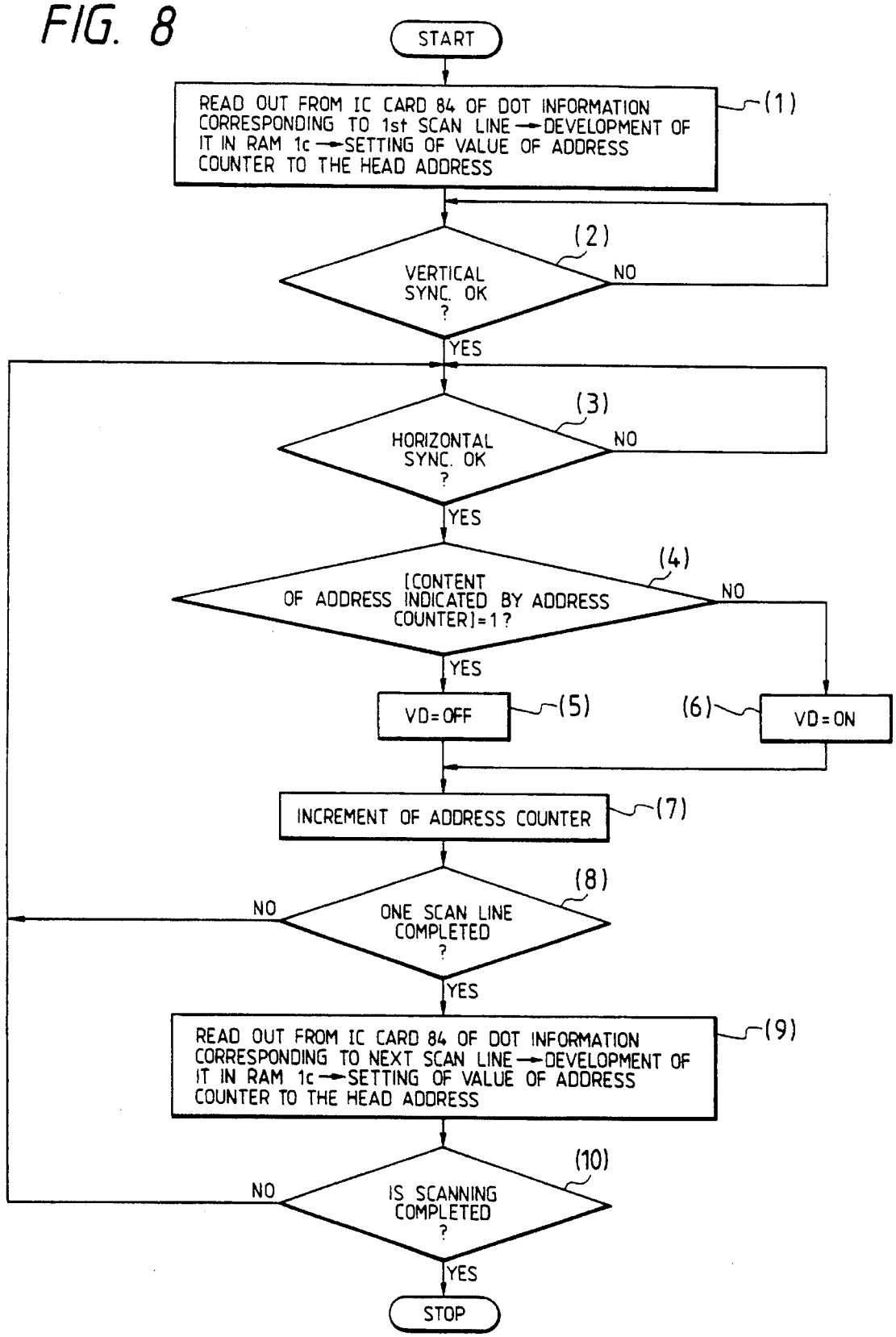
FIG. 8 is a flow chart showing the sequence for forming a format image according to the present invention.

In the following discussion, there will be explained a format image forming operation of the present invention, while making reference to FIG. 8 showing a flow chart of the operation, wherein (1) to (10) are control steps.

Dot information corresponding to a first scanning line is read from the IC card 84 and developed in the RAM 1c, and an address counter is set at the first address (1). Then a signal for activating the registration rollers 27 is released, and the timing of vertical synchronization (in the advancing direction of sheet) is awaited (2). After the vertical synchronization is achieved, there is awaited the horizontal synchronization (in the scanning direction) by the detection of the laser beam with an unrepresented beam detector (3). Then there is discriminated whether the content of the address indicated by the address counter is "1" (black dot) (4), and, if it is "1", the video signal VD from the CPU 1a is turned off (5). Then a black latent image is formed on the photosensitive member 17, and the sequence proceeds to a step (7). On the other hand, if it is not "1", the video signal VD from the CPU 1a is turned on (6) to form a white latent image on the photosensitive member 17.

Then the content of the address counter (not shown) is increased by one (7), and there is discriminated whether a scanning line has been completed (8). If not, the sequence returns to the step (3). If completed, the dot information of a next scanning line is read from the IC card 84 and developed in the RAM 1c, and the address counter is set at the first address of the scanning line (9). Then there is discriminated whether the vertical scanning has been completed (10), and, if not, the sequence returns to the step (2), but, if completed, the sequence is terminated. Thereafter the formation of the format sheet image is enabled under the control of the CPU 1a, and is executed by a known electrophotographic process.

Figure 9:
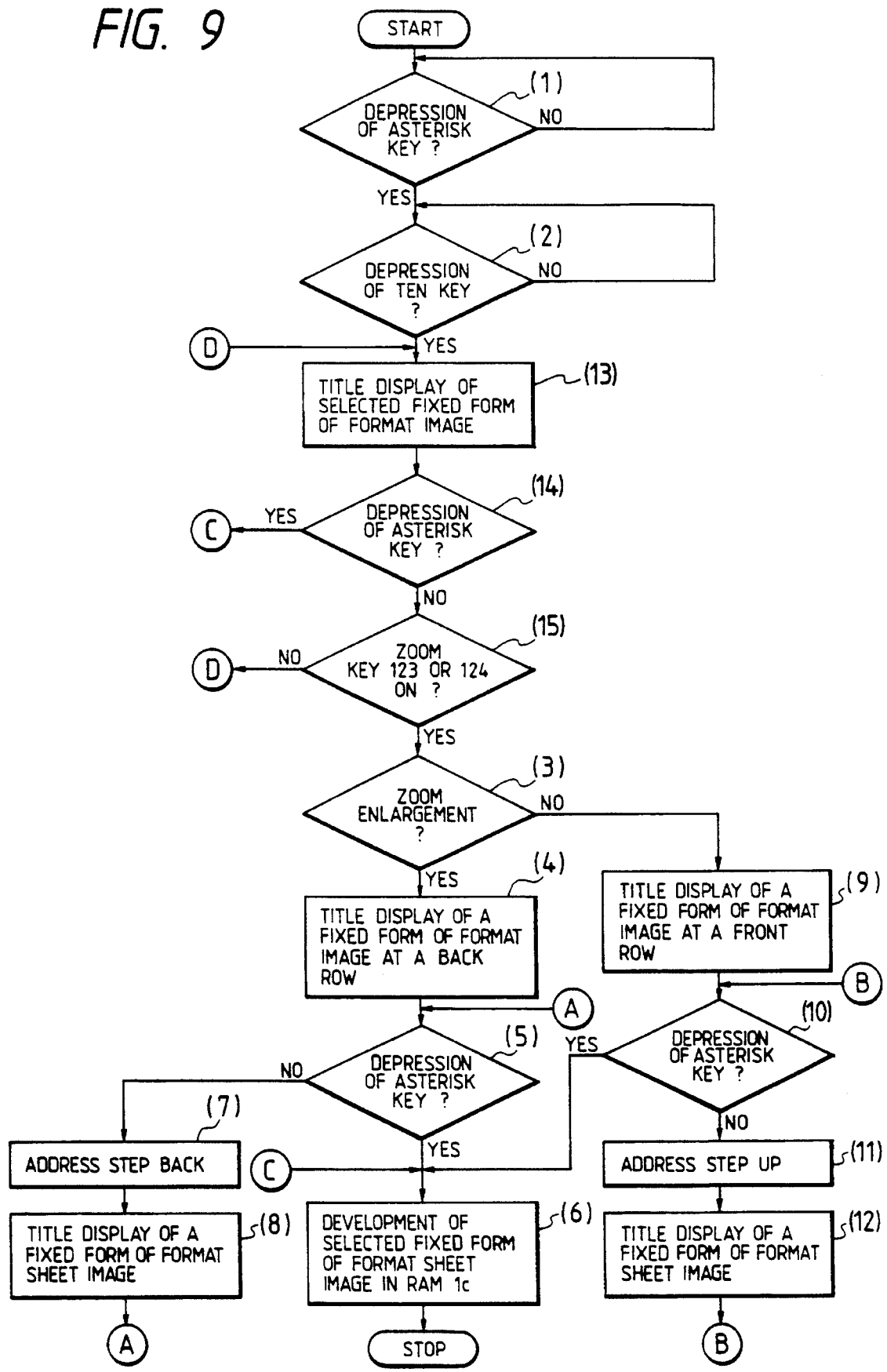
FIG. 9 is a flow chart showing the sequence for selecting a format sheet image by a sequence controller shown in FIG. 6.

In the following discussion, there will be explained an operation for selecting the format sheet image, by the sequence controller 1 shown in FIG. 1, with reference to FIG. 9 which is a flow chart thereof, wherein (1) to (12) indicate process steps.

At first there is awaited the depression of the asterisk key 111 (1), and the format sheet image selecting mode is assumed in response to such depression. Then there is awaited the actuation of the numeral keys 116 (2), and, in response to such actuation, the title of the format sheet image (plural images being stored in the IC card 84) instructed by the numeral key 116 is displayed on the display 140 shown in FIG. 5.

Then there is discriminated whether the asterisk key 111 has been depressed, and, if depressed, the sequence proceeds to a step (6) for developing the selected format sheet image on the RAM 1c. If the asterisk key 111 has not been depressed, there is discriminated whether the zoom key 123 or 124 has been depressed (15), and, if not depressed, the sequence returns to a step (13). On the other hand, if depressed, the sequence proceeds to a step (3) for discriminating whether the zoom key 123 has been depressed, and, if depressed, the title of the format sheet image of the back row stored in the IC card 84 are shown on the display 140 (4).

Then there is discriminated whether the asterisk key 111 has been depressed (5), and, if depressed, the selected format sheet image is developed on the RAM 1c (6) and the sequence is terminated.

On the other hand, if the discrimination in the step (5) turns out negative, indicating that the zoom key 124 has been depressed, the address of the area of the format sheet images stored in the IC card 84 is stepped back (7), Then the title of the format sheet image at such stepped-back address is shown on the display 140 (8), and the sequence returns to the step (5).

On the other hand, if the discrimination in the step (3) turns out negative, the title of the format sheet image in the front row is shown on the display 140 (9).

Then there is discriminated whether the asterisk key 111 has been depressed (10), and, if depressed, the sequence returns to the step (6), but, if not depressed, the address of the area of the format sheet images stored in the IC card 84 is advanced by a step (11), then the title of the format sheet image at the advanced address is shown on the display 140 (12) and the sequence returned to the step (10).

Thereafter the format sheet image is formed according to the above-explained procedure. In this manner it is rendered possible to select format images from a single IC card 84 by storing plural format sheet images therein.

In case of synthesizing such format image stored in the IC card 84 with an arbitrary original image on a same face or different faces of the recording sheet, the operator selects the multiple mode or the two-side mode by the key 130 or 127. Then the format sheet image selecting mode is selected by the asterisk key 111, then a desired format sheet image is selected with the numeral keys, and the copy start key 114 is depressed. Thus the format information is read from the IC card 84 as explained before and copied by the laser 13 on a desired number of sheets, which are temporarily stored in the intermediate tray 32. Then the operator places an original to be synthesized on the original support glass 2 and depresses the copy start key 114 again, whereby the copying operation for the original is initiated with the scanning unit. The sheets stored in the intermediate tray 32 are fed again, then subjected to the copying of the image of the original on the same side or different sides of the sheets, and are finally discharged onto the tray 45.

In this manner it is made possible to synthesize the format image stored in the IC card 84 with an arbitrary original image.

Figure 10:
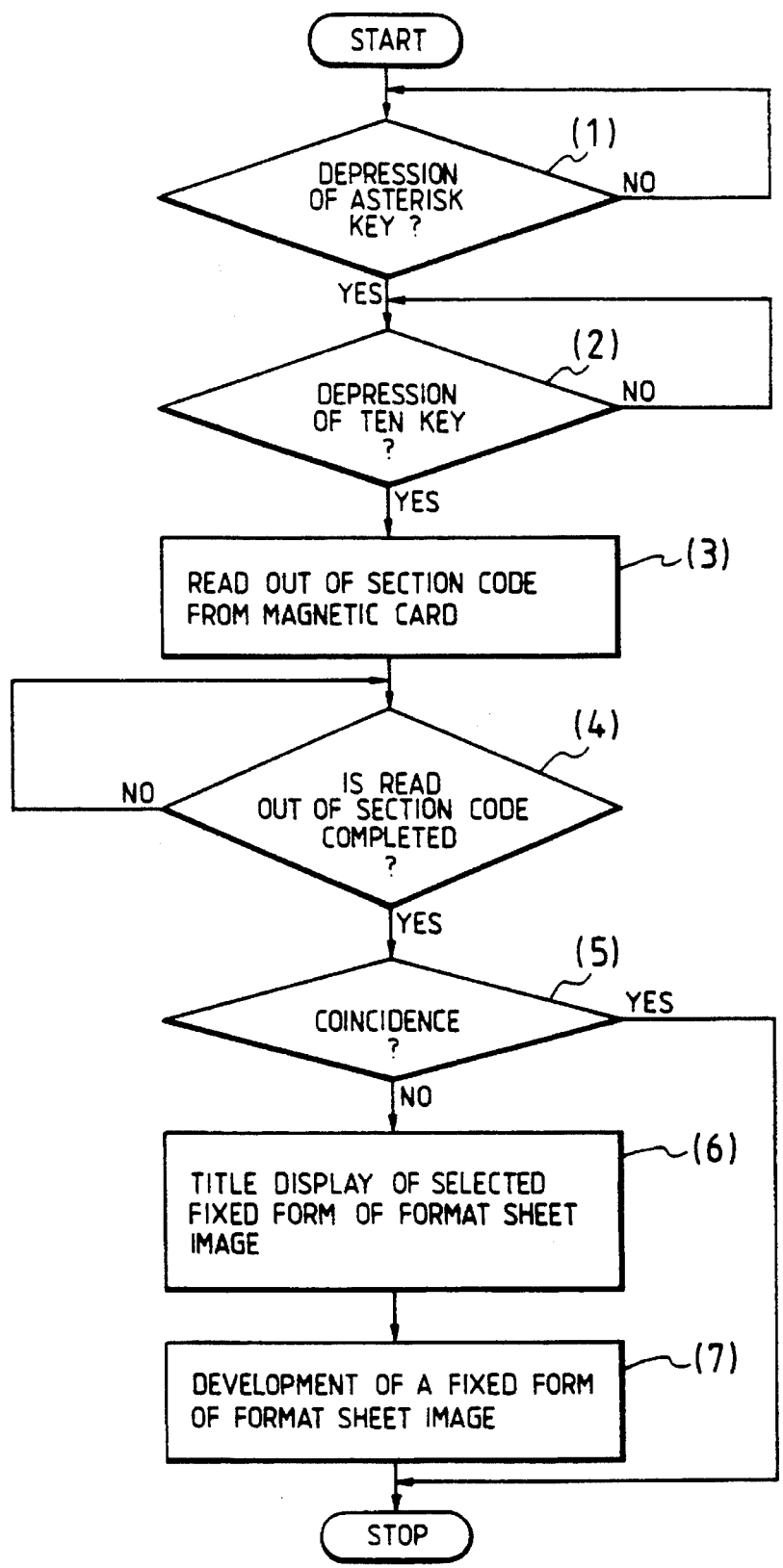
FIG. 10 is a flow chart showing the sequence for suspending the copying of image of the format sheet by the sequence controller shown in FIG. 6.

Now reference is made to FIG. 10 for explaining the operation of prohibiting the copy of the format sheet image by the sequence controller 1 shown in FIG. 1.

In the present embodiment the IC card 84 also stores the division codes for which the reading and copying of the format image are prohibited, and such reading and copying are prohibited in case the division code read from the magnetic card coincides with one of the division codes stored in the IC card 84.

FIG. 10 is a flow chart showing the sequence of prohibiting the copying of the format sheet image by the sequence controller 1 shown in FIG. 1, wherein (1) to (7) indicate process steps.

At first there is awaited the depression of the asterisk key 111 (1), and the format sheet image selecting mode is assumed in response to such depression. Then awaited is the depression of the numeral key 116 (2), and, in response to such depression, the division code stored in the magnetic card 94 inserted in the administration unit E is read (3) and written in the work area of the RAM 1c. Then there is awaited the completion of reading of the division codes, from the IC card 84, for which the copying of the format sheet image is prohibited (4), and, upon completion of such reading, there is discriminated whether the division code read from the magnetic card 94 coincides with one of the prohibited division codes stored in the IC card 84 (5). In case of coincidence, the sequence is terminated without the development of the selected format sheet image on the RAM.

On the other hand, in case of absence of coincidence in the discrimination of the step (5), the title of the selected format sheet image is shown on the display 140 (6), then the format sheet image is developed on the RAM 1c of the sequence controller 1 (7) and the sequence is terminated.

In this manner it is rendered possible to limit the copying of the format sheet image to certain divisions, thereby preventing erroneous preparation of the format sheets.

Figure 11:
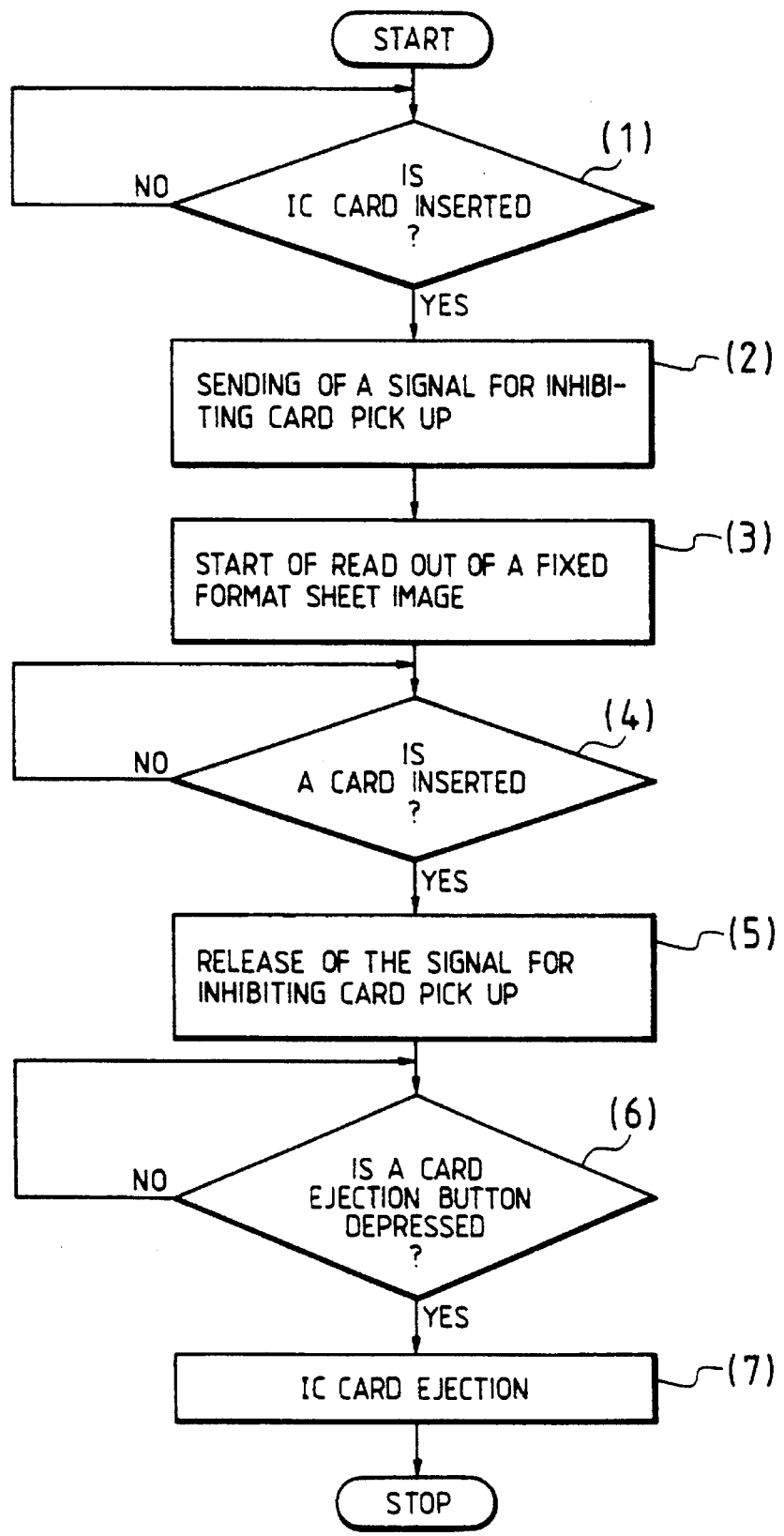
FIG. 11 is a flow chart showing the sequence of a first embodiment for prohibiting the removal of the IC card by the sequence controller shown in FIG. 6.
Figure 12:
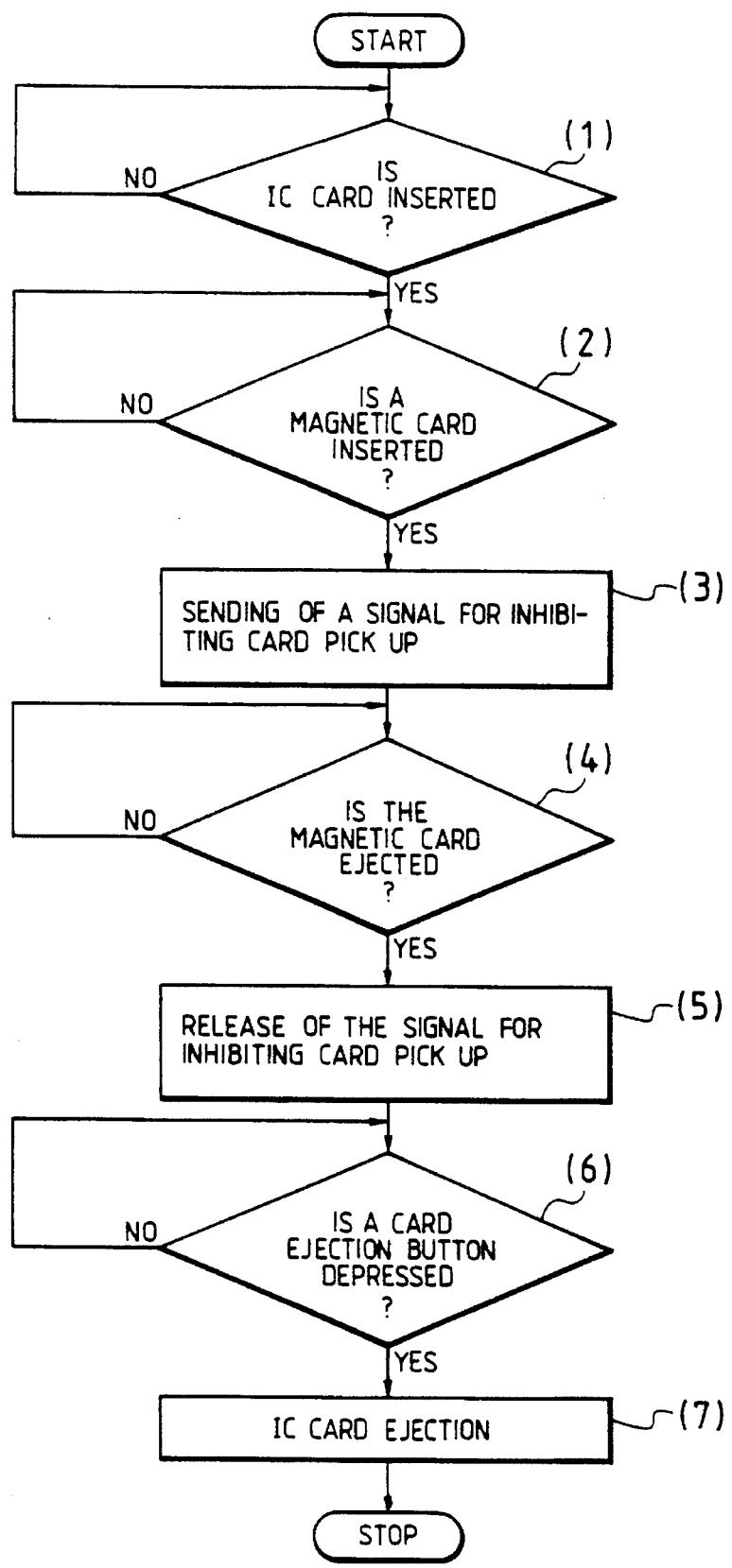
FIG. 12 is a flow chart showing the sequence of a second embodiment for prohibiting the removal of the IC card by the sequence controller shown in FIG. 6.

Now reference is made to FIGS. 11 and 12 for explaining an operation for prohibiting the extraction of the IC card 84 by the sequence controller 1 shown in FIG. 6.

FIG. 11 is a flow chart showing a first embodiment of the sequence of prohibiting the extraction of the IC card 84 by the sequence controller 1 shown in FIG. 6, wherein (1) to (7) indicate process steps.

At first there is awaited the insertion of the IC card 84 into the IC card unit D connectable to the main body A (1), and, upon such insertion, the CPU 1a sends a card extraction disable signal to the IC card unit D (2). Then the format sheet image data stored in the IC card 84 are read and developed on the RAM 1c (3).

Then there is awaited the insertion, into the administration unit E, of a card, for example the magnetic card 94, storing code information enabling the extraction of the IC card 84 (4), and, upon such insertion, the CPU 1a cancels the card extraction disable signal supplied to the IC card unit D (5). Then there is awaited the depression of the card eject button 82 (6), and, in response to such depression the IC card 84 is ejected (7).

FIG. 12 is a flow chart showing a second embodiment of the IC card extraction prohibiting sequence, wherein (1) to (7) indicate process steps.

At first there is awaited the insertion of the IC card 84 into the IC card unit D connectable to the main body A (1), and, upon such insertion, there is awaited the insertion of the magnetic card 94 into the administration unit E (2). In response to such insertion, the CPU 1a sends a card extraction disable signal to the IC card unit D (3). Then the data of the format sheet image stored in the IC card 84 are read and developed on the RAM 1c.

Subsequently there is awaited the ejection of the magnetic card 94 inserted into the administration unit E (4), and, in response to such ejection, the CPU 1a cancels the card extraction disable signal supplied to the IC card unit D (5). Then awaited is the depression of the card ejection button 82 (6), and, in response to such depression, the IC card 84 is ejected (7).

Figure 13A:
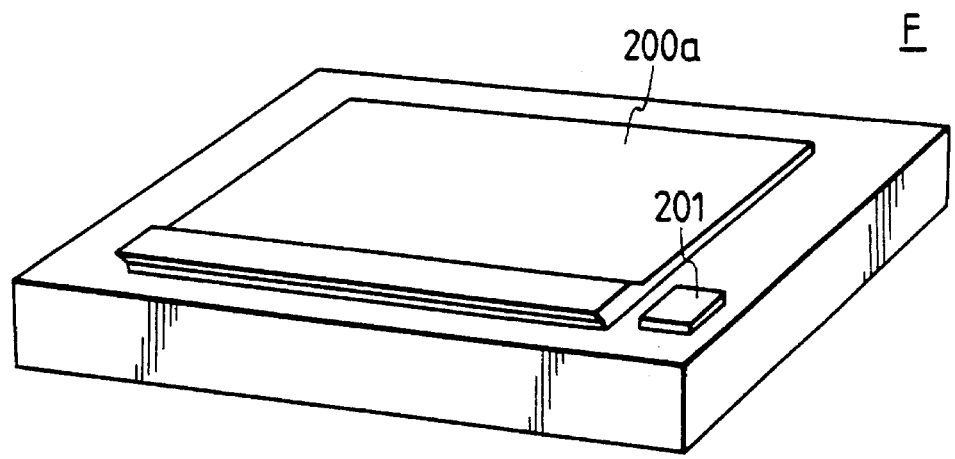
FIGS. 13A and 13B are perspective views of an image scanner showing an example of an image input unit shown in FIG. 1.
Figure 13B:
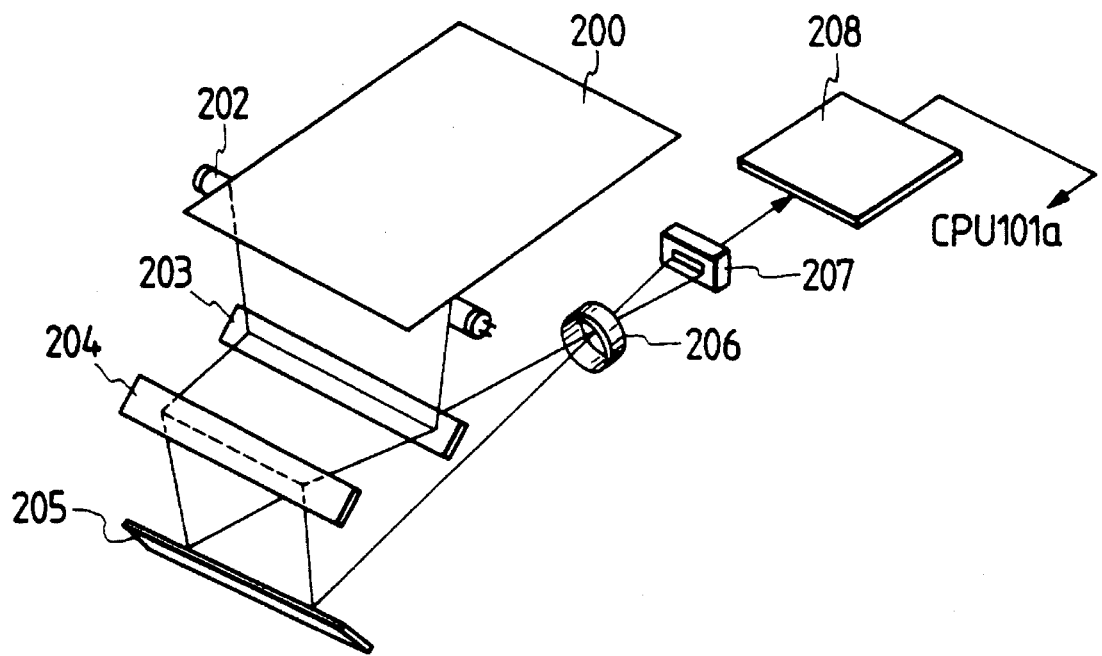

In the following there will be explained the structure of the image input unit F shown in FIG. 1, with reference to FIGS. 13A and 13B. In the present embodiment a desired original image can be read for example with an image scanner and the obtained data can be stored in the IC card FIGS. 13A and 13B are respectively an external perspective view and a view showing the internal structure, showing an example of the image scanner in the image input unit F shown in FIG. 1.

In these drawings, an original support glass 200 supports a format sheet original (not shown) in a predetermined position, and such original is maintained in position by a pressure plate 200a. A scanning start switch 201 is used for instructing, to the CPU 1a of the system controller 1, the start of scanning of the format sheet original. An illuminating lamp 202 illuminates the format sheet original placed on the glass 200. Scanning mirrors 203–205 guide the light, reflected from the original, to an imaging lens 206. An image sensor 207, composed for example of a CCD, converts the image of the original, focused by the imaging lens 206, into electrical signals (analog image signals). An A/D converter 208 converts the electrical signals, from the image sensor 207, into digital signals for supply to the CPU 1a.

When the scanning start switch 201 is depressed, an optical scanning unit consisting of the illuminating lamp 202 and the scanning mirror 203 integral therewith starts the scanning of the original, and the reflected light is guided through the mirrors 203–205 to the imaging lens 206 and focused on the image sensor 207. The charges accumulated in the light sensors in the CCD constituting the image sensor 207 are in succession converted into analog voltage signals, which are supplied to the A/D converter 208 connected thereto. The A/D converter 208 converts the analog electrical signals, sent in succession from the image sensor 207, into digital signals corresponding to the image density, for supply to the CPU 1a of the sequence controller 1. The CPU 1a writes the digital signals, in succession, into the IC card 84 inserted into the IC card unit D, either directly or through the RAM 1c and in synchronization with unrepresented clock signals. As explained before, the IC card 84 can store plural format sheet original images entered from the image scanner, and a desired format image can be read and reproduced at any time, as explained before.

In the foregoing embodiments the image writing means is composed of a laser unit and is utilized for writing the format sheet image data, stored in the IC card 84, on the photosensitive member 17, but the image writing means may also be composed of an LED array, a liquid crystal shutter, an ink jet printer, a thermal printer or the like.

Also in the foregoing embodiments, the external memory means is composed of the IC card 84, but it may also be composed of other memory media such as a memory card, a magnetic memory or a laser card.

Also in the foregoing embodiments, the format sheet image data stored in the IC card 84 are developed, line by line, on the RAM 1c, but it is also possible to develop the data, in the unit of a format, or to transfer the data directly from the IC card 84 to the laser driver 1g without using the RAM 1c.

Furthermore, in the foregoing embodiments, the format sheet image is processed in the form of dot information, but it may also be processed in the form of character information.

Furthermore, in the foregoing embodiments, the information of the format sheet original is entered from the image scanner and stored in the IC card 84, but it is also possible to incorporate the image input unit F in the main body A, or to store the format sheet data, prepared by a word processor, in the IC card 84.

What is claimed is:

1. An image forming apparatus, comprising:

a reception unit for receiving therein an external memory medium storing image data representing a plurality of images;

input/output means for inputting/outputting data in/from the external memory medium received in said reception unit;

reading means for reading an original, and for outputting image data in accordance with the original;

control means for controlling storing in the external memory of image data outputted from said reading means, and for controlling reading out of stored image data from the external memory medium;

exposing means for exposing an original;

operation means;

display means for displaying information concerning image data to be selected so as to select at least one data from the data representing a plurality of images stored in the external memory medium, said display means displaying the information concerning image data to be selected, changed for each actuation of said operation means;

selection means for selecting at least one image from the data representing a plurality of images stored in the external memory medium; and recording means for recording on one sheet both an image of the original exposed by said exposing means and the image selected by said selection means.

2. An apparatus according to claim 1, wherein said reception unit receives an integrated circuit card comprising a semiconductor memory.

3. An apparatus according to claim 1, wherein said recording means records on one side of the sheet both an image of the original exposed by said exposing means and an image based on the image data stored in said external memory medium.

4. An apparatus according to claim 1, wherein said recording means records on different sides of the sheet both an image of the original exposed by said exposing means and an image based on the image data stored in said external memory medium, respectively.

5. An apparatus according to claim 1, wherein said recording means comprises a first recording unit for recording on the sheet an image of an original exposed by said exposing means and a second recording unit for recording on the sheet an image based on the image data stored in a said external memory medium.

6. An image forming apparatus, comprising:

a first reception unit for receiving therein a first external memory medium storing image data and identification data;

input/output means for inputting/outputting data in/from the first external memory medium received in said first reception unit;

reading means for reading an original, and for outputting image data in accordance with the original;

control means adapted for controlling storing in the first external memory of image data outputted from said reading means, and for controlling reading out of image data from the first external memory medium;

exposing means for exposing an original;

recording means for recording on one sheet both an image of the original exposed by said exposing means and an image based on the image data stored in the first external memory medium;

a second reception unit for receiving therein a second external memory medium storing identification data; and input means for inputting data from the second external memory medium received in said second reception unit, wherein said control means prevents reading-out of image data from the first external memory medium when the identification data stored in the second external memory medium corresponds to the identification data stored in the first external memory medium.

7. An apparatus according to claim 6, wherein said reception unit receives an integrated circuit card comprising a semiconductor memory.

8. An apparatus according to claim 6, wherein said recording means records both an image of the original exposed by said exposing means and an image based on the image data stored in the external memory medium on one side of the sheet.

9. An apparatus according to claim 6, wherein said recording means records both an image of the original exposed by said exposing means and an image based on the image data stored in the external memory medium, respectively on different sides of the sheet.

10. An apparatus according to claim 6, wherein said recording means comprises a first recording unit for recording on the sheet an image of an original exposed by said exposing means and a second recording unit for recording on the sheet an image based on the image data stored in a said external memory medium.

11. An image forming apparatus, comprising:
a reception unit for receiving therein an external memory medium storing image data;
input/output means for inputting/outputting data in/from the external memory medium received in said reception unit;
reading means for reading an original, and for outputting image data in accordance with the original;
control means adapted for controlling storing in the external memory of image data outputted from said reading means, and for controlling reading out of image data from the external memory medium;
exposing means for exposing an original; and
recording means for recording on one sheet both an image of the original exposed by said exposing means and an image based on the image data stored in said external memory medium,
wherein said recording means records on different sides of the sheet both an image of the original exposed by said exposing means and an image based on the image data stored in said external memory medium, respectively.

12. An image forming apparatus, comprising:
a reception unit for receiving therein an external memory medium storing image data representing a plurality of images;
input/output means for inputting/outputting data in/from the external memory medium received in said reception unit;
reading means for reading an original, and for outputting image data in accordance with the original;
control means for controlling storing in the external memory of image data outputted from said reading means, and for controlling reading out of stored image data from the external memory medium;
exposing means for exposing an original;
operation means;
display means for displaying a title of each image data so as to select at least one data from the data representing a plurality of images stored in the external memory medium;
selection means for selecting at least one image from the date representing a plurality of images stored in the external memory medium, wherein an image to be selected by said selection means is changed to a next image upon actuation of said operation means; and
recording means for recording on one sheet both an image of the original exposed by said exposing means and the image selected by said selection means.

13. An apparatus according to claim 12, wherein said operation means comprises a plurality of keys, wherein when one of said plurality of keys is depressed, images to be selected are shifted forward, and when another of said plurality of keys is depressed, the images to be selected are shifted backward.

14. An apparatus according to claim 12, wherein said display means displays titles one by one.

15. An image processing method comprising the steps of:
reading an original and generating image data in accordance with the read original;
storing the generated image data in an external memory medium;
reading out stored image data from the external memory medium;
exposing a second original;
displaying information concerning an image to be selected so as to select at least one of the data representing a plurality of images stored in the external memory medium;
selecting at least one image from the data representing a plurality of images stored in the external memory medium; and
recording on one sheet both an image of the exposed second original and the selected image,
wherein in said displaying step, the information concerning the image to be selected, changed for each actuation of an operation means, is displayed.

16. A method according to claim 15, further comprising a step of recording an integrated circuit card comprising a semiconductor memory.

17. A method according to claim 15, wherein said recording step records on one side of the sheet both an image of the original exposed by said exposing means and an image based on the image data stored in said external memory medium.

18. A method according to claim 15, wherein said recording step records on different sides of the sheet both an image of the original exposed by said exposing means and an image based on the image data stored in said external memory medium, respectively.

19. An image processing method comprising the steps of:
reading an original and generating image data in accordance with the read original;
storing the generated image data in an external memory medium;
reading out stored image data from the external memory medium;
exposing a second original:
displaying a title of each image so as to select at least one of the data representing a plurality of images stored in the external memory medium;
selecting at least one image from the data representing a plurality of images stored in the external memory medium; and
recording on one sheet both an image of the exposed second original and the selected image,
wherein an image to be selected by said selection step is changed into another one whenever an operation means is actuated.

20. A method according to claim 19, wherein the operation means includes at least two keys, and wherein when one key is depressed, images to be selected are shifted forward, and when the other key is depressed, the images to be selected are shifted backward.

21. A method according to claim 19, wherein said display step displays the title one by one.

22. An image processing method comprising the steps of:
reading out image data from the first external memory medium;
exposing an original;
recording on one sheet both an image of the exposed original and an image based on the image data stored in the first external memory medium; and
inputting data from a second external memory medium,
wherein, in said recording step, reading-out of image data from the first external memory medium is prevented when the identification data stored in the second external memory medium corresponds to the identification data stored in the first external memory medium.

23. A method according to claim 22, further comprising a step of recording an integrated circuit card comprising a semiconductor memory.

24. A method according to claim 22, wherein said recording step records on one side of the sheet both an image of the original exposed by said exposing means and an image based on the image data stored in said external memory medium.

25. A method according to claim 22, wherein said recording step records on different sides of the sheet both an image of the original exposed by said exposing means and an image based on the image data stored in said external memory medium, respectively.

26. An image forming apparatus, comprising:

a first reception unit for receiving therein a first external memory medium storing image data and identification data;

input means for inputting data from the first external memory medium received in said first reception unit;

control means adapted for controlling reading out of image data from the first external memory medium;

exposing means for exposing an original;

recording means for recording on one sheet both an image of an original exposed by said exposing means and an image based on the image data stored in the first external memory medium;

a second reception unit for receiving therein a second external memory medium storing identification data; and input means for inputting data from the second external memory medium received in said second reception unit, wherein said control means prevents reading-out of image data from the first external memory medium when the identification data stored in the second external memory medium corresponds to the identification data stored in the first external memory medium.

27. An apparatus according to claim 26, wherein said reception unit receives an integrated circuit card comprising a semiconductor memory.

28. An apparatus according to claim 26, wherein said recording means records on one side of the sheet both an image of the original exposed by said exposing means and an image based on the image data stored in said external memory medium.

29. An apparatus according to claim 26, wherein said recording means records on different sides of the sheet both an image of the original exposed by said exposing means and an image based on the image data stored in said external memory medium, respectively.

30. An image processing method comprising the steps of:

reading an original and generating image data in accordance with the read original;

storing in a first external memory of image data;

reading out of image data from the first external memory medium;

exposing an original;

recording on one sheet both an image of the exposed original and an image based on the image data stored in the first external memory medium; and inputting data from a second external memory medium, wherein said control step prevents reading-out of image data from the first external memory medium when the identification data stored in the second external memory medium corresponds to the identification data stored in the first external memory medium.

* * * * *

UNITED STATES PATENT AND TRADEMARK OFFICE
CERTIFICATE OF CORRECTION

PATENT NO. : 5,485,245

DATED : January 16, 1996

INVENTOR(S) : KENJI KOBAYASHI, et al.

It is certified that error appears in the above-indentified patent and that said Letters Patent is hereby corrected as shown below:

IN THE DRAWINGS

Sheet 6

Figure 6, "CLATCH" should read --CLUTCH--.

COLUMN 2

Line 2, "side" (second occurrence) should read --sides--;
Line 10, "cross sectional" should read --cross-sectional--; and
Line 20, "view-of" should read --view of--.

COLUMN 3

Line 30, "record" should read --records--;
Line 40, "aligns" should read --align--; and
Line 55, "by arrow," should read --by an arrow,--; and "an means" should read --means--.

COLUMN 4

Line 16, "said" should read --the--.

COLUMN 6

Line 6, "and" should be deleted.

UNITED STATES PATENT AND TRADEMARK OFFICE
CERTIFICATE OF CORRECTION

PATENT NO. : 5,485,245

DATED : January 16, 1996

INVENTOR(S) : KENJI KOBAYASHI, et al.

It is certified that error appears in the above-indentified patent and that said Letters Patent is hereby corrected as shown below:

COLUMN 9

Line 1, "includes" should read --include--;
   Line 8, "motor 27" should read --motor 27 is--, and "Fig. 1" should read --Fig. 6--; and
   Line 9, "sensoring" should read --sensor in--.

COLUMN 12

Line 4, "(7)-indicate" should read --(7) indicate--.

COLUMN 15

Line 3, "a" should be deleted; and
   Line 47, "date" should read --data--.

COLUMN 16

Line 56, "title" should read --titles--.

UNITED STATES PATENT AND TRADEMARK OFFICE
CERTIFICATE OF CORRECTION

PATENT NO. : 5,485,245

DATED : January 16, 1996

INVENTOR(S) : KENJI KOBAYASHI, et al.

It is certified that error appears in the above-indentified patent and that said Letters Patent is hereby corrected as shown below:

<u>COLUMN 18</u>

Line 21, "of" should read --the--.

Signed and Sealed this

Seventeenth Day of December, 1996

Attest:

BRUCE LEHMAN

*Attesting Officer*   *Commissioner of Patents and Trademarks*